United States Patent [19]

Cavanagh

[11] Patent Number: 5,063,068

[45] Date of Patent: Nov. 5, 1991

[54] METHOD OF PRODUCING LAMINATED WAFERS

[75] Inventor: Paul A. Cavanagh, Scituate, R.I.

[73] Assignee: Cavanagh Company, Greenville, R.I.

[21] Appl. No.: 534,503

[22] Filed: Jun. 7, 1990

[51] Int. Cl.$^5$ .......................... A21D 13/00; A23G 3/00
[52] U.S. Cl. ........................................ 426/94; 426/275;
426/497; 426/502; 426/503; 426/549; 426/560
[58] Field of Search .................. 426/502, 503, 560, 94, 426/275, 497, 549

[56] References Cited

U.S. PATENT DOCUMENTS

| | | | |
|---|---|---|---|
| 1,975,326 | 10/1934 | Loose et al. | 426/502 |
| 2,888,887 | 6/1959 | Wolf | 426/275 |
| 3,670,665 | 6/1972 | Levi | 426/502 |
| 3,867,559 | 2/1975 | Haas | 426/94 |
| 4,352,831 | 10/1982 | Cavanagh et al. | 426/502 |
| 4,469,476 | 9/1984 | Cavanagh et al. | 425/216 |
| 4,518,617 | 5/1985 | Haas Sr., et al. | 426/502 |
| 4,621,997 | 11/1986 | Cavanagh, Jr. et al. | 425/299 |

FOREIGN PATENT DOCUMENTS 3142738 5/1983 Fed. Rep. of Germany ...... 426/275

*Primary Examiner*—Donald E. Czala
*Assistant Examiner*—Jean L. Aberle

[57] ABSTRACT

Laminated bread wafers are produced by fusing at least part of the opposing outer friable crust of two (or more) sheets of bread. Each sheet is composed of outer friable crusts surrounding a center which is soft and porous relative to the crusts. Specifically, one outer crust or a first sheet and one outer crust of a second sheet are moistened by applying droplets of water (e.g. from sprayed water or steam) sufficient to render them fusable. Thereafter, the moistened outer crusts are pressed together to fuse them. Alternatively, an aqueous paste is applied between at least part of an outer crust of the first sheet and at least part of an outer crust of the second sheet, and the sheets are pressed together to fuse them. The resulting laminated bread product comprises multiple layers with a sealed edge, the layers being arranged in the following order: a top friable crust, a porous softer upper core layer, a central fusion layer, a porous softer lower core layer, and a bottom friable crust.

11 Claims, 2 Drawing Sheets

METHOD OF PRODUCING LAMINATED WAFERS

BACKGROUND OF THE INVENTION

This invention relates to the general field of manufacturing bread wafers, such as those used for religious communion.

Generally communion wafers are made with flour and water, without leavening or additives. To be appropriate for use in communion, the product must be soluble in the mouth and not brittle or cracker-like. The product should also have a long shelf life.

Traditionally, communion wafers are formed from bread sheets that are created by cooking batter between metal plates in close adjustment. The wafer thickness varies from about 0.030 to 0.072 inches.

Cavanagh et al. U.S. Pat. No. 4,352,831; 4,621,997; and 4,469,476 describe specific methods and apparatus for manufacturing unleavened wafers, such as those used in the Eucharist. In general, batter is baked into a thin sheet of unleavened bread, friable outer crusts and a relatively soft, porous center. The wafers are punched from the sheet using a roll with wafer-cutting cavities. A design in the cavity is imparted to the wafer during cutting.

Attempts to increase thickness generally require increased temperature, risking scorching and an undesirable crystalline texture. Thicker products also exhibit undesirable crumbling and cracker-like brittleness.

SUMMARY OF THE INVENTION

In one aspect, the invention generally features a method for producing laminated bread wafers which includes fusing at least part of the opposing outer friable outer crusts of two (or more) sheets of bread, the sheets being composed of such outer crusts enclosing a center which is soft and porous relative to the crusts.

The preferred embodiments of the method include moistening at least one outer crust of the first sheet and at least one outer crust of the second sheet, by applying droplets of water (e.g. from sprayed water or steam) sufficient to render them fusable. Thereafter, the moistened outer crusts are pressed together to fuse them. Alternatively, an aqueous paste is applied between at least part of an outer crust of the first sheet and at least part of an outer crust of the second sheet, and the sheets are pressed together to fuse them.

In either alternative, the preferred method involves forming a wafer during the fusing operation. Specifically, the two fusable outer crusts are pressed together in an operation that comprises punching wafers. The two sheets of bread are arranged with the fusable crusts facing one another, and the sheets are advanced between wafer-forming members. The punching operation of the wafer-forming members presses the fusable outer crusts together to create a laminated wafer. Most preferably, the wafer forming members comprise a roller having a wafer-forming cavity. The cavity has a fixed bottom portion and a gradually sloping surface rising from the bottom portion to a cutting edge around the cavity, and the method comprises pressing the two sheets into the cavity to form the wafer.

More specifically, the cavity comprises a lower side wall sloped at an angle of at least 5° with respect to the bottom portion, and an upper side wall sloped at an angle of between 20° and 85° with respect to the bottom portion. During the wafer-forming operation, the sheets are pressed into the cavity so that the edge of the first sheet is forced into the cavity against the lower cavity wall until the bottom sheet contacts the cavity bottom. Thereafter, the sheet edges are sealed by the crimping action of the upper cavity wall. Also, the cavity is at least 0.030 inches deep, so that the resulting wafer is at least 0.060 inches thick.

If desired, the sheets of bread may be humidified before fusion and the cavity bottom may comprise an element to impress a design on the bread product.

In a second aspect, the invention generally features a laminated bread product comprising multiple layers with a sealed edge, the layers being arranged in the following order: a top friable crust, a porous softer upper core layer, a central fusion layer, a porous softer lower core layer, and a bottom friable crust.

In preferred embodiments, the laminated bread product is a wafer at least 0.090 inches thick, and at least one of the friable crust layers is impressed with a design.

A third aspect of the invention generally features a bread product made by the method described above.

The invention provides a product in which multiple (usually two) sheets of bread are laminated in a way that is aesthetically acceptable——e.g., lamination is not apparent visually or in the mouth. The edge is clean, without undesirable irregularities or fractures. The resulting product is far thicker than conventional communion wafers, yet it retains the important characteristics of a communion wafer in that it: a) can be made from flour and water alone; b) is soluble in the mouth; c) exhibits no scorching or other discoloration; d) has the ability to be impressed with an appropriate design, in a consistant position, without variability in registration between the design and the wafer.

The resulting wafer product is more substantial and more breadlike in texture than conventional wafers. It has the appearance of a slightly raised bread without the use of leavening. The wafer's softness is inherent in its porous structure, and does not depend on retained moisture. As a result, its shelf-life is extremely long. In contrast to lamination provided by sugar-based frosting in non-liturgical wafers, where the layered profile is intentionally displayed, the invention provides a concealed smooth lamination to increase wafer thickness. Of course, the invention introduces no sugar or other components which are unacceptable in liturgical wafers.

DESCRIPTION OF THE PREFERRED EMBODIMENT DRAWINGS

Process and Apparatus

Figure 1:
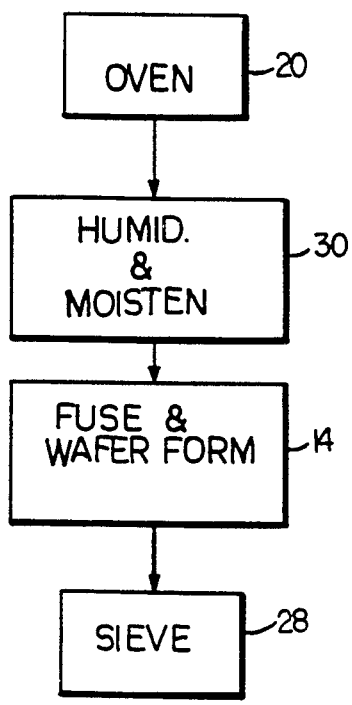
FIG. 1 is a flow diagram showing steps in a method of wafer formation.

FIG. 1 shows the basic steps in wafer formation: a) baking batter in an oven 20 to form bread sheets; b) humidifying and moistening the bread sheets in apparatus 30; c) fusing the bread sheets while forming wafers in wafer former 14; d) sorting the wafers from fragments in seive 28.

Figure 2:
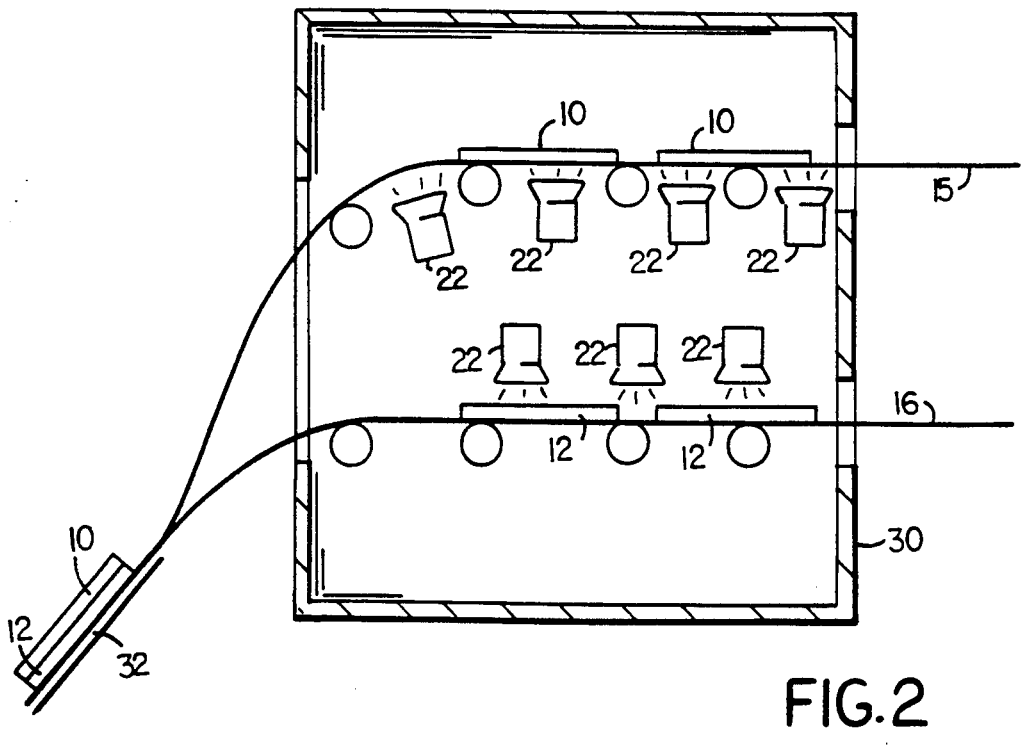
FIG. 2 is a highly diagrammatic representation of a humidifying and crust-moistening station on a wafer production line according to the invention.

In. FIG. 2, bread sheets 10 and 12 are formed in a conventional way from a flour and water batter. Specifically, a flour-water batter the consistency of heavy cream is baked between metal plates maintained at about 250° F.–275° F. for about 1–2 minutes to create a sheet of bread about 0.030 to 0.072 inches thick. Conveyors 15 and 16 are set up to transport sheets 10 and 12.in pairs to a humidifier, where they are maintained at 100% relative humidity and 125° F. for about one half hour. Each sheet has outer friable outer crust and a softer porous core.

Humidifier 30 includes two sets of spray nozzles 22 which are directed to spray hot steam or water droplets onto the bottom crust of sheet 10 and the top crust of sheet 12. Since the bread sheets are gelatinized wheat starch, slight moistening of the crusts immediately, but briefly, renders them very sticky with distinct adhesive capability.

Figure 3:
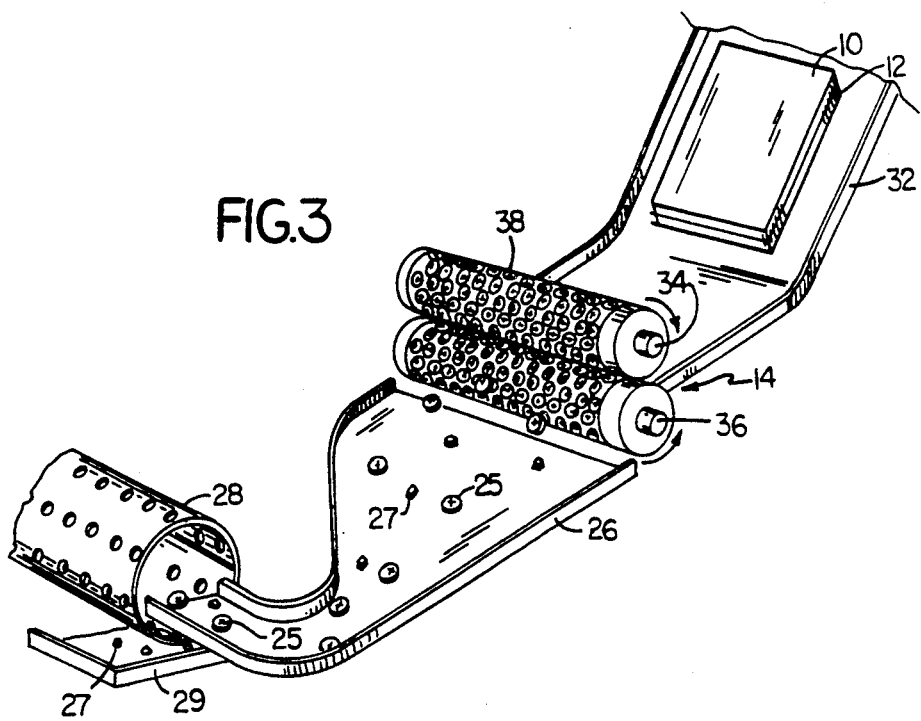
FIG. 3 is a highly diagrammatic representation of a wafer-formation and fusion station.

Immediately downstream from the humidifier, the two sheets are transported via tray 32 to wafer-former apparatus 14, with their moistened crusts in contact with one another. Specifically, in FIG. 3, roller cutters 34 and 36 similar to those disclosed in U.S. Pat. No. 4,352,831; 4,469,476; and 4,621,997 (hereby incorporated by reference) having cavities 38 with cutting edges 39 will apply sufficient pressure to effect a permanent bond between the moistened sheets. Moreover, the process of cutting the wafer in such a die seals the edges of the two sheets at the wafer edqe, so that the resulting wafer shows virtually no visual or tactile indication of lamination. The wafer edqe is a smooth taper without unsightly crumbling or fracturing. Wafers 25 are discharged from tray 26 to a seive 28 which sorts them from fragments 27.

As is disclosed in the three patents referenced above, a design may be impressed in the top or bottom friable crust of the laminate wafer, or in both of those crusts, by including a raised design on the bottom surface of the cavity.

Figure 4:
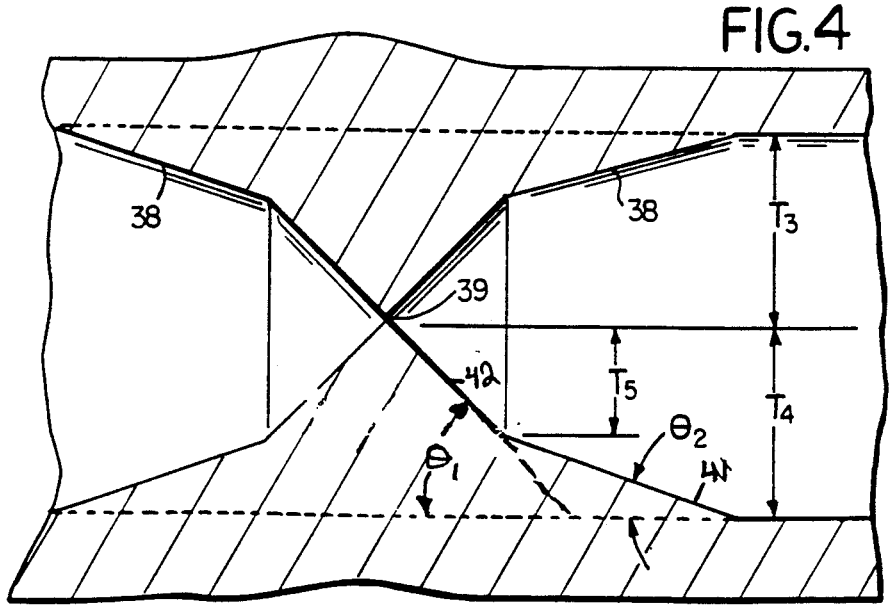
FIG. 4 is an enlargement, in section, of a die used in the production line of FIG. 1.

FIG. 4 shows an enlarged cross-section of a die cavity 38. The cavity has a depth $T_3+T_4=$ at least 0.100 and most preferably about 0.140. The cavity comprises a lower side wall 41 sloped at an angle $\theta_2$ with at least 5° and most preferably about 10° with respect to the bottom of the cavity. Upper side wall 42 is sloped at an angle of $\theta_1$ of 20°–85° (most preferably about 60°) with respect to the bottom of the cavity.

Product

Figure 5:
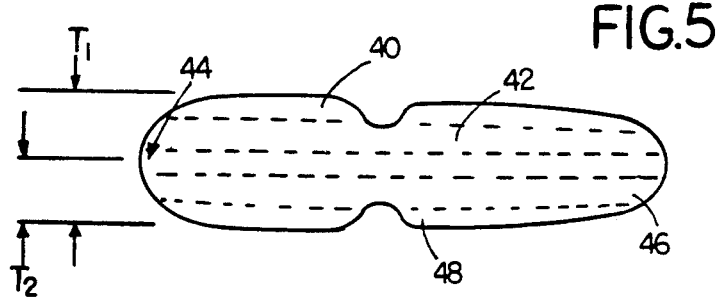
FIG. 5 is a highly diagrammatic sectional view of a laminated wafer according to the invention.

FIG. 5 shows a laminated wafer 25 according to the invention in cross section. In FIG. 5, the laminated wafer includes: an upper friable crust 40; an upper porous core 42; a transition or fusion layer 44 (formed by fusing two moistened friable crusts of sheets 10 and 12 and, if present, the paste described below); a lower porous core 46; and a lower friable crust 48. The thickness of the total wafer $T_1$ is preferably at least 0.100 inches and most prefereably about 0.140 inches i.e., each wafer has a thickness $T_2$ of about 0.070 inches.

Other Embodiments

Other embodiments are within the following claims. For example, other methods of fusing sheets of bread can be used. One fusion method involves the application of ground and pulverized cooked bread (e.g., from fragments 27 a bread sheet like the ones being fused collected in tray 29) in an aqueous paste. The aqueous paste would literally glue the sheets together, by forming a fusion layer which includes not only the facing friable outer crusts of sheets 10 and 12, but also the paste.

While circular wafers are shown, the wafers can be oval or even square or rectangular (with slightly rounded corners).

I claim:

1. A method for producing laminated bread wafers comprising, first producing at least two sheets of bread by baking a batter comprising flour and water, each sheet having opposing friable outer crusts enclosing a center which is soft and porous relative to the crusts, and then fusing at least part of one outer crust of a first one of the sheets of bread to at least part of one outer crust of a second one of the sheets of bread by the following steps:

(a) moistening at least one outer crust of the first sheet and at least one outer crust of the second sheet, by applying an aqueous-composition sufficient to render them fusable, and (b) thereafter, fusing at least part of the two fusable outer crusts, the method being characterized by advancing the sheets between wafer-forming members in an operation that forms the wafers and seals the outer crust edges to conceal lamination.

2. The method of claim 1 in which the two unfused sheets of bread are advanced between the wafer-forming members with their fusable outer crusts facing one another, and portions of the sheets are fused in the process of forming the wafer, fusion and wafer formation being accomplished as the outer crust edges are sealed to conceal lamination.

3. The method of claim 1 wherein said aqueous composition comprises aqueous droplets.

4. The method of claim 1 wherein said aqueous composition comprises a water and flour paste.

5. The method of claim 1, 2, 3 or 4 in which the wafer-forming members comprise a roller having at least one wafer-forming cavity.

6. The method of claim 1, 2, 3 or 4 in which the wafer-forming members comprise at least one cavity having a fixed bottom portion and a gradually sloping surface rising from the bottom portion to a cutting edge around the cavity, and the method comprises pressing the two sheets of bread against the cutting edge of the cavity so that the cutting edge of the cavity cuts the wafer and seals the edges of the friable crusts.

7. The method of claim 6 in which the cavity comprises a lower side wall sloped at an angle of at least 5° with respect to the bottom portion, and an upper side wall sloped at an angle of between 20° and 85° with respect to the bottom portion, and said method comprises compressing said sheets of bread into said cavity so that first the sheets edges are forced into the cavity against the lower cavity wall sheets until one of them contacts the cavity bottom, and then the sheet edges are sealed by the crimping action of the upper cavity wall.

8. The method of claim 5 in which the method comprises pressing the sheets of bread into a wafer cavity at least 0.030 inches deep, so that the laminated bread product is a wafer at least 0.060 inches thick.

9. The method of claim 6 in which said cavity bottom comprises an element to impress a design on the bread product.

10. The method of claim 1, 2, 3 or 4 in which said method comprises humidifying said sheets of bread before fusion.

11. The method of claim 3 in which said droplets are supplied by spraying water or steam.

* * * * *